United States Patent [19]
Hedin

[11] 3,934,428
[45] Jan. 27, 1976

[54] FLEXIBLE COUPLING
[75] Inventor: Sven Arvid Hedin, Huddinge, Sweden
[73] Assignee: ITT Industries, Inc., New York, N.Y.
[22] Filed: May 10, 1974
[21] Appl. No.: 468,761

[52] U.S. Cl. .................... 64/15 C; 64/2 P; 403/229
[51] Int. Cl.² .......................................... F16D 3/52
[58] Field of Search........... 64/15 C, 15 R, 2 P, 6 R, 64/27 R, 27 C; 403/121, 229

[56] References Cited
UNITED STATES PATENTS

| | | | |
|---|---|---|---|
| 1,505,596 | 8/1924 | Karge | 64/15 C |
| 1,513,944 | 11/1924 | Stephenson | 64/15 C |
| 2,655,012 | 10/1953 | McCrery | 64/2 P |
| 2,980,457 | 4/1961 | Page | 403/229 X |
| 3,000,198 | 9/1961 | Stout | 64/15 C |

Primary Examiner—Samuel Scott
Assistant Examiner—Randall Heald
Attorney, Agent, or Firm—J. B. Raden; D. P. Warner

[57] ABSTRACT

A flexible coupling is provided for use between the shaft of a screw pump rotor and that of a driving motor where the shafts are required to transfer considerable axial forces and are subject to rotating out of axial alignment with each other. The respective shaft ends are formed either as cones or sections of spheres and are held together by a screwspring which envelopes both ends and transfers much of the torque from one shaft to the other while reducing the possibility for lateral displacement of the shafts. The shaft ends are positioned to roll against each other to reduce wear when the shafts rotate.

4 Claims, 2 Drawing Figures

FLEXIBLE COUPLING

BACKGROUND OF THE INVENTION

1. Field of the Invention

This invention relates to a coupling unit for use between two shafts. It relates particularly to a coupling unit for transferring torque between two shafts which may be aligned at varying angles with each other and at the same time may be loaded with strong axial pressures. The invention relates particularly to means for driving so-called screw pumps for which a coupling unit is desirable which is capable of transferring torque between shafts which vary in their alignment with each other.

2. Description of the Prior Art

A screw pump consists of a rotatable screw, a rotor, which usually is made of a metallic meterial and which is arranged within a cylinder with a screw shaped inner surface made of resilient material, called the stator.

Due to the construction of a screw pump the rotor, when rotating, makes an oscillating movement, which means that the rotor shaft and the drive shaft during rotation will form an angle with each other, which angle changes continuously.

When working, relatively strong axial forces also occur between the rotor and the stationary part which forces must be carried by the coupling between the rotor and the driving shaft.

In screw pumps having relatively small dimensions it is possible to transfer the turning torque by help of a rigid shaft, a so-called torsion bar. The torque and bending forces in such a pump are so limited, that a solid bar of this type may be acceptable.

In bigger screw pumps, however, other power transfer devices are needed. In such cases it is known to use universal joints of different sorts, Oldham Joints, Crass-slide Joints and others. Common to all these types of couplings is the fact that they can transmit relatively large forces. The disadvantages include the facts that they are relatively complicated, require a lot of space, and are expensive to manufacture. Even their durability in many cases is too poor to provide an acceptable dependability, especially when they are subjected to strong axial forces.

SUMMARY OF THE INVENTION

The problem of transferring rotary torque between the driving shaft and the pump rotor shaft by relatively big screw pumps is solved according to the invention. In preferred embodiments, the two heading end surfaces of the shafts are made conical or spherical so that, when the shafts are parallel, the end surfaces only make contact with each other at one single point in the center. On the other hand, when the shafts form an angle with each other, a rolling takes place, along the two end surfaces during rotation. The two ends of the shafts are prevented from moving radially relative to each other by help of another device which grips both of the shafts and transfers much of the turning torque between the two shafts.

BRIEF DESCRIPTION OF THE DRAWINGS

The invention is described more fully below with reference to the drawings, in which.

DESCRIPTION OF PREFERRED EMBODIMENTS

Figure 1:
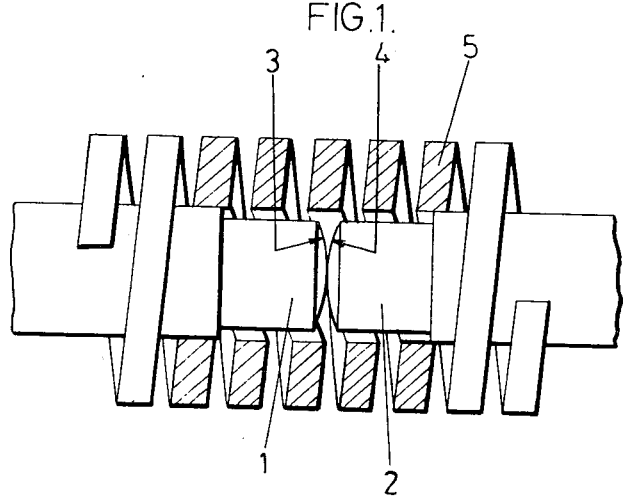
FIG. 1 shows a coupling with spherical end surfaces in a non-bent position and FIG. 2 shows a coupling with conical end surfaces in a bent position.

In FIG. 1, numbers 1 and 2 stand for two shaft ends with spherical end surfaces 3 and 4, and 5 stands for a screw spring serving as a driver between the shafts.

The function of the device is as follows. If no angle between the two shafts is at hand, that is if the two shafts are parallel and have a common center line, the two shaft ends will just touch each other in their centers, as indicated in FIG. 1.

If two shafts having spherical ends form an angle, the contact point will move along a circle formed on each end somewhat out from the center of the shaft; that is, the shaft ends will roll against each other. This embodiment is favorable when the bending angle $\alpha$ is varying, whereby the radius of the mentioned line will vary.

Figure 2:
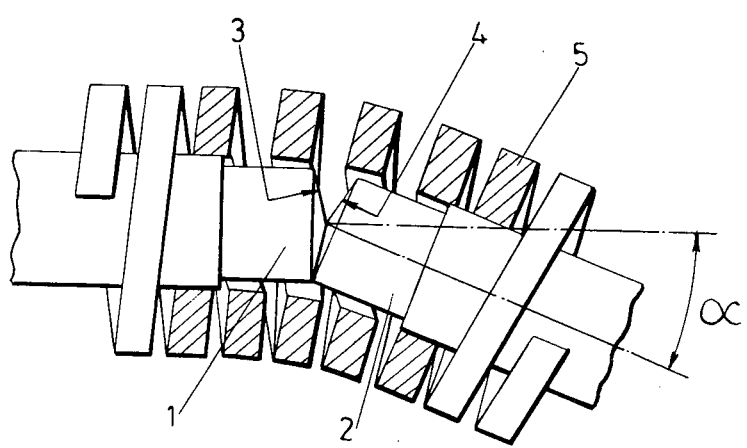

If the bending angle $\alpha$ is constant, the embodiment shown in FIG. 2 may be suitable. The cone angle is then determined in accordance with the normal bending angle between the two shafts, which varies depending on the type of pump. By making this cone angle choice, rolling will be directed along the mantle surfaces of the cones which means a considerably diminished surface pressure and because of that a diminished wear.

For driving a screw pump it is suitable to arrange two couplings of this type in order to get good operation even when the driving shaft and the rotor shaft are parallel but have their center lines radially dislocated.

The torque transferring screw spring may be of either rectangular or circular cross section, but for special conditions, the rectangular form is preferred.

The invention disclosed is a simple and inexpensive coupling having special qualities, including the ability to transmit power through angular connections and ability to withstand strong surface pressures. It is very suitable for driving screw pumps but is useable in other different fields of application.

While the principles of the invention have been described above in connection with specific apparatus and applications, it is to be understood that this description is made only by way of example and not as a limitation on the scope of the invention.

I claim:

1. A coupling for two rotating torque transferring shafts which are subject to variations in the angles they rotate with respect to each other and are exposed to strong axial pressures comprising, prepared heading surfaces on the ends of two shafts formed as conical or spherical surfaces so that, when the shafts are parallel and the ends of the shafts are placed in contact with each other they make contact with each other at a single central point, and when the shafts form an angle of less than 180° with respect to each other during a period of rotation, the two end surfaces roll against each other, and means for preventing the two ends of the shafts from moving radially relative to each other, said means serving also as a torque transfer device transferring a portion of the turning torque between the two shafts, where the torque transferring device is a screw spring which is arranged around the ends of the two shafts.

2. The invention according to claim 1, in which the torque transferring device is a screw spring which is arranged around the ends of the two shafts.

3. The invention according to claim 1, in which, when the heading surfaces are sections of spheres, rolling between the two surfaces occurs along circles formed along point contacts between the surfaces.

4. The invention according to claim 1, in which when the heading surfaces are conical surfaces, the rolling normally occurs along line contacts between the mantle surfaces of the conical surfaces.

* * * * *